United States Patent Office.

GEORGE F. WILSON, OF EAST PROVIDENCE, RHODE ISLAND.

Letters Patent No. 90,327, dated May 18, 1869.

IMPROVEMENT IN THE MANUFACTURE OF BLACK PIGMENT FOR MAKING SHOE-BLACKING, &c.

The Schedule referred to in these Letters Patent and making part of the same.

*To all whom it may concern:*

Be it known that I, GEORGE F. WILSON, of the town of East Providence, in the county of Providence, and State of Rhode Island, have invented a new Black Pigment for Shoe-Blacking, and other purposes, and processes for making the same; and I do hereby declare the following to be a full and exact description thereof, reference being had to the accompanying drawing, which represents a hydrostatic mill used for grinding compounds, made in accordance with my invention.

To enable others to understand, make, and use my invention, who are skilled in this and corresponding arts, I will proceed to describe the same.

My invention consists in the preparation of black pigment from bone-coal, or ivory-black, in its application to various uses, and in the processes necessary to both its preparation and use.

Heretofore, black pigment from bone-coal, or ivory-black, as it is called and known, has been usually prepared by reducing this article to a conveniently-fine powder, and then mixing it with some liquid, or fluid, such as water, oil, turpentine, vinegar, and some other acids, molasses, varnish, and so on, or their various combinations, and putting up the compound, so prepared, in various ways, for use in such of the arts as these preparations seemed to be adapted to; or it has been mixed with these and other suitable bodies, and afterwards the compound was ground, and put up in the manner and for the purpose before described.

The object in using bone-coal in any and all of these various methods of preparing, and compounding, and grinding it, has been to obtain a jet or nearly jet-black paint, varnish, blacking, or color, having few or no objectionable properties in the use to which it was to be applied. This object has been but imperfectly attained.

Bone-coal, or ivory-black, consists principally of carbon, from carbonized chondrine, gelatine, and fat found in bone or ivory, and of phosphate of lime, also constituents of bone and ivory. Phosphate of lime is a white, or grayish-white body.

If bone-coal, or ivory-black is used in the preparation of a paint-color, or blacking, by mixing it in either of the ways described, the jet-black color sought is impaired by the presence of the phosphate of lime, or the salts of lime, in like manner as it would be if the carbon had been reduced to a powder, and mixed with either of the liquids referred to, to which had been added the proportionate quantity of phosphate of lime, or other salts of lime, such as sulphate of lime, chloride of calcium, and so on, produced by the use, in the mixture, of sulphuric acid, muriatic acid, and so on.

Take, for instance, carbon, one part, and, grinding it in oil, mix with it plaster of Paris, (sulphate of lime,) four parts. It is easy to understand how the lustre of the jet-black carbon would be impaired thereby.

The painter who wishes to produce a slate-color, mixes, with lamp-black and oil, white lead.

In the preparation of the "ivory-black" and "drop-black," so called, used by painters and others in the arts, bone-black, or ivory-black is ground in water, or oil, or other suitable liquids, but it contains the phosphate of lime.

In the preparation of blacking, it is customary to make a compound of finely-powdered bone-coal, molasses, oil, gum-arabic, sulphuric, muriatic, or acetic acid, or some other acid capable of decomposing phosphate of lime. This plan reduces the phosphate of lime, and deposits a lime-salt, in fine powder, in the mass, and necessarily converts the molasses or sugar into a varnish; but neither the paint not the blacking so made is a very stable compound. They are both, to a greater or less extent, disturbed by ammonia, making the articles to which they are applied to look as though they had been rubbed with plumbago, or stove-blacking. A peculiar instance of this is seen in carriages kept in stables.

Besides this difficulty and objection, in the case of blacking, the mineral or other acids employed in its manufacture, and their salts of lime, which are to a certain extent soluble, very often seriously injure the leather to which it is applied.

My method of proceeding to obtain the jet-black color, or pigment sought for in the arts, is the following:

I take good bone-black, or ivory-black, as it is called, in fine powder, and digest it with a solution in water, in equivalent proportions, of any acid that will readily withdraw the phosphate of lime from the carbon. I then separate the carbon, by filtration, or decantation, or any convenient method, from the solution, and purify by agitating in water, allowing the heavier particles, silicates, dirt, and so on, to settle out, and pouring or draining off the supernatant liquor containing the lighter carbon in suspension, which is to be allowed to settle in a separate vessel, and I then dry it, when wanted in that condition for use.

In the preparation of the drop-black paint, color, or ink aforesaid, I reduce this carbon to a fine powder, and grind it in the mill *a*, shown in the accompanying drawings, (which I have devised for the purpose,) in water, oil, turpentine, varnish, or other desirable fluid, and put it up in any convenient form, for preservation and use.

In the preparation of blacking, I also reduce this carbon to a fine powder, and mix it with other ingredients, and in about the following proportions, to wit:

For four pounds of carbon I use three pounds of molasses, or sugar equivalent to it; six pounds of liquid acid phosphate of lime, standing at 16° Baumé; one ounce of gum-arabic; and ten ounces of spermaceti, tallow, or stearine, or eight ounces of sperm-oil.

I boil the liquid acid phosphate of lime, and the molasses or sugar, and gum-arabic together, to expel a part of the water, and to convert the molasses or sugar into a varnish, or gum, that will readily polish. When the boiling is completed, I mix in the bone-coal, and pour into the mass, thus made, the spermaceti, tallow, or oil, &c., while hot. I then grind the whole through the mill, as finely as possible. It is now ready to be put up for use.

I find, by experience, that the liquid acid phosphate, even when applied clear, has no perceptible injurious effect on leather, nor on many other animal and vegetable organizations, and, at the same time, answers all the useful purposes of sulphuric or other acids commonly used for this purpose.

On attempting to grind this production in a common paint-mill, I found it passed through very slowly, on account of the viscid character of the product. I therefore devised a method of securing pressure on the mass to be ground, so as to make it "feed" faster into the mill.

I fitted tightly and firmly to the hopper of the mill, a cover, B, having an opening at C for the reception of the pipe D, with a funnel, E, attached to it at the top. This pipe D may be about two inches' interior diameter, and of any convenient length, according to the pressure required.

The cover B also has another small opening at F, into which the cock G is inserted. This cock serves the purpose of letting out the air, when the mill is to be filled through the funnel and pipe D, and of preventing the substance to be ground from escaping when the mill is filled.

It will be obvious that the hydrostatic mill can be used not only for this but for other purposes.

What I claim as my invention, and desire to secure by Letters Patent, is—

1. The manufacture, substantially as herein described, of black pigment.

2. The method of grinding and mixing the blacking, or other compound, under pressure, by the employment of a hydrostatic mill, substantially as herein specified.

3. The use of the above-described pigment, for the purposes herein specified.

In testimony whereof, I have signed my name to this specification, before two subscribing witnesses.

GEO. F. WILSON.

Witnesses:
N. D. ARNOLD,
S. W. BAKER.